(12) United States Patent
Bae et al.

(10) Patent No.: US 11,824,352 B2
(45) Date of Patent: Nov. 21, 2023

(54) POWER SUPPLY DEVICE, VEHICLE HAVING THE SAME, AND METHOD OF CONTROLLING THE SAME

(71) Applicants: HYUNDAI MOTOR COMPANY, Seoul (KR); KIA CORPORATION, Seoul (KR)

(72) Inventors: JungHyeon Bae, Yongin-si (KR); SangJae Han, Hwaseong-si (KR); Jin Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/101,156

(22) Filed: Jan. 25, 2023

(65) Prior Publication Data

US 2023/0163615 A1 May 25, 2023

Related U.S. Application Data

(62) Division of application No. 16/785,190, filed on Feb. 7, 2020, now Pat. No. 11,594,907.

(30) Foreign Application Priority Data

Nov. 14, 2019 (KR) ........................ 10-2019-0145502

(51) Int. Cl.
*H02J 7/00* (2006.01)
*B60K 16/00* (2020.01)

(52) U.S. Cl.
CPC .............. *H02J 7/007* (2013.01); *B60K 16/00* (2013.01); *B60K 2016/003* (2013.01)

(58) Field of Classification Search
CPC .. B60K 2016/003; H02J 7/007; H01M 10/465
See application file for complete search history.

(56) References Cited

U.S. PATENT DOCUMENTS 9,821,666 B2 * 11/2017 Maeno ..................... B60L 50/40
9,902,273 B2 * 2/2018 Maeno ..................... B60L 7/12
(Continued)

FOREIGN PATENT DOCUMENTS

JP       2008172959 A  *  7/2008
KR    20190025225 A  *  3/2019

*Primary Examiner* — Katy M Ebner
(74) *Attorney, Agent, or Firm* — LEMPIA SUMMERFIELD KATZ LLC

(57) ABSTRACT

A method of controlling a vehicle includes: determining whether a condition for entry into a refresh mode of a battery in the vehicle is satisfied; when the condition is satisfied, predicting an amount of power generated by a solar generator; determining whether to perform the refresh mode based on the predicted amount of power; when the refresh mode is determined to perform, charging the battery using the power generated by the solar generator; identifying a charge amount of the battery; when the identified charge amount is greater than or equal to a first reference charge amount, terminating charging the battery; when an ignition-on command is received, determining whether the charge amount of the battery is greater than or equal to the first reference charge amount; when the charge amount of the battery is less than the first reference charge amount, charging the battery using power generated by an alternator.

5 Claims, 11 Drawing Sheets

(56) References Cited

U.S. PATENT DOCUMENTS

| | | | |
|---|---|---|---|
| 10,236,703 B2* | 3/2019 | Chung | H02J 4/00 |
| 10,351,011 B2* | 7/2019 | Kubo | B60L 58/20 |
| 2010/0253278 A1* | 10/2010 | Chang | B60L 53/51 |
| | | | 320/101 |
| 2011/0248667 A1* | 10/2011 | Umeoka | B60K 16/00 |
| | | | 320/101 |
| 2016/0207418 A1* | 7/2016 | Bergstrom | B60G 3/06 |
| 2018/0201150 A1* | 7/2018 | Kubo | B60L 58/25 |
| 2019/0207414 A1* | 7/2019 | Park | B60L 53/51 |

\* cited by examiner

FIG. 4

| | AMOUNT OF LIGHT (w/m₂) | | |
|---|---|---|---|
| | LESS THAN 300 | 300 ~ 600 | GREATER THAN OR EQUAL TO 600 |
| LESS THAN 85% OF BATTERY SOC | NOT PERFORM REFRESH MODE | PERFORM REFRESH MODE UPON CONDITION SATISFIED | PERFORM REFRESH MODE |
| GREATER THAN OR EQUAL TO 85% OF BATTERY SOC | NOT PERFORM REFRESH MODE | | |

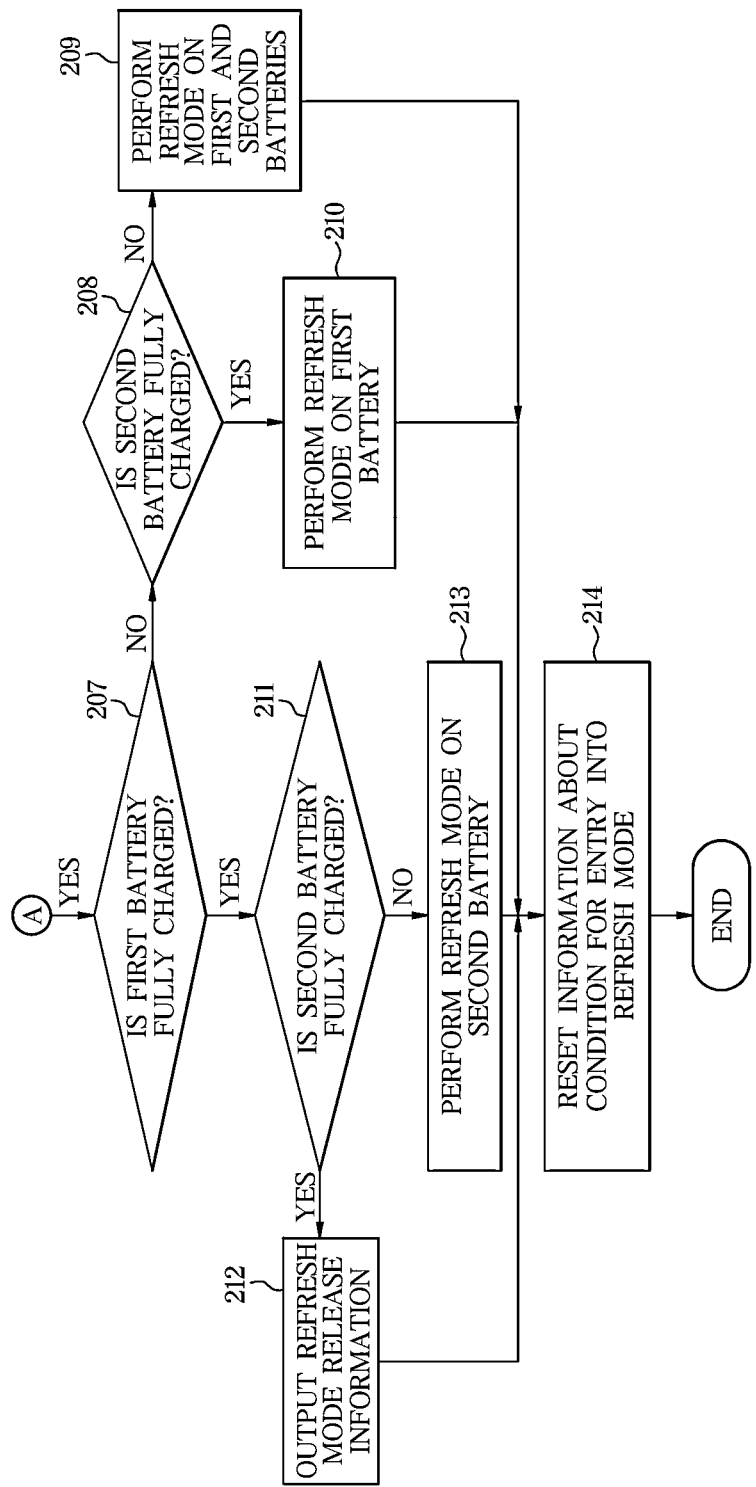

FIG. 9

|  |  | SECOND BATTERY (SOC) | |
|---|---|---|---|
|  |  | LESS THAN 85% | GREATER THAN OR EQUAL TO 85% |
| FIRST BATTERY (SOC) | LESS THAN 85% |  | PREFERENTIALLY CHARGE SECOND BATTERY |
|  | GREATER THAN OR EQUAL TO 85% | PREFERENTIALLY CHARGE FIRST BATTERY | | ns
POWER SUPPLY DEVICE, VEHICLE HAVING THE SAME, AND METHOD OF CONTROLLING THE SAME

CROSS-REFERENCE TO RELATED APPLICATION

This application is a divisional application of non-provisional U.S. patent application Ser. No. 16/785,190, filed on Feb. 7, 2020, which claims priority to and the benefit of Korean Patent Application No. 10-2019-0145502, filed on Nov. 14, 2019, the entire contents of each of which are incorporated herein by reference.

TECHNICAL FIELD

The present disclosure relates to a power supply device for extending the life of a battery, a vehicle having the same, and a method of controlling the vehicle.

BACKGROUND

The statements in this section merely provide background information related to the present disclosure and may not constitute prior art.

A vehicle includes, as a member for supplying electric power to various electric loads in the vehicle, a battery and an alternator that supplies power generated during driving of the vehicle to the battery and the electric loads.

Recently, due to energy saving and environmental issues, research on environmentally friendly vehicles using high voltage batteries as energy sources, such as hybrid electric vehicles (HEVs) and electric vehicles (EVs), has been actively conducted.

Since the batteries used in the vehicles are frequently charged and discharged within a certain range, and due to deep cycles, the endurance life of the battery is reduced. In addition, the battery may have charge and discharge capacity degradation due to a memory effect in which the capacity of the battery is incorrectly read when the battery incompletely discharged is charged, and thus the capacity gradually decreases. In addition, in the case of a vehicle having a short distance or short time travelling pattern, the battery is not fully charged during travel, which results in reduction of the battery life.

In addition, when the battery is fully charged during travel, the fuel economy may be lowered in proportion to the increasing charge amount of the battery.

SUMMARY

The present disclosure provides a power supply device for supplying electrical energy generated by a solar generator to a battery if a battery refresh condition is satisfied, a vehicle having the same, and a method of controlling the vehicle.

It is an aspect of the present disclosure to provide a power supply device for controlling a preferential charging of a second battery on the basis of a state of charge of a first battery if a battery refresh condition is satisfied, a vehicle having the same, and a method of controlling the vehicle.

It is another aspect of the present disclosure to provide a power supply device for charging a battery using electric energy generated during travel if the charge amount of the battery charged when parked is less than a reference charge amount, a vehicle having the same, and a method of controlling the vehicle.

Additional aspects of the disclosure will be set forth in part in the description which follows and, in part, will be obvious from the description, or may be learned by practice of the disclosure.

Therefore, an aspect of the present disclosure provides a power supply device including: a solar generator; a battery configured to supply power for driving at least one load and on which recharging is performed; a charge amount detector configured to detect a charge amount of the battery; and a controller configured to perform charging control on the battery using electric energy generated by the solar generator, and perform charging termination control on the battery if the charge amount of the battery detected by the charge amount detector during the charging control of the battery is greater than or equal to a first reference charge amount.

The controller may identify an accumulative value of current during charging and discharging of the battery, may identify a number of times the charge amount falls to a minimum charge or below, and if the accumulative value of current exceeds a first reference value or the identified number of times the charge amount falls to the minimum charge or below exceeds a second reference value, may determine that a condition for entry into a refresh mode for charging the battery to the first reference charge amount is satisfied.

The power supply device may further include a light amount detector configured to detect an amount of light incident on the solar generator, wherein the controller, in response to determining that the condition for entry into the refresh mode is satisfied, may identify the amount of light detected by the light amount detector, and if the identified amount of light is less than a first reference amount of light, may not perform the charging control on the battery, and if the identified amount of light is greater than or equal to a second reference amount of light, may perform the charging control on the battery.

The controller may determine whether the charge amount of the battery detected by the charge amount detector is greater than or equal to a second reference charge amount if the identified amount of light is greater than or equal to the first reference amount of light and less than the second reference amount of light, and perform the charging control on the battery if the charge amount of the battery detected by the charge amount detector is determined to be greater than or equal to the second reference charge amount.

The controller may predict an amount of power generated by the solar generator on the basis of the detected amount of light and a time remaining until a sunset if the detected charge amount of the battery is determined to be less than the second reference charge amount, perform the charging control on the battery if a value of the predicted amount of power minus an amount of power consumed by the at least one load is greater than or equal to zero, and may not perform charging control on the battery if the value of the predicted amount of power minus the amount of power consumed by the at least one load is less than zero.

The controller may cancel the refresh mode if the detected charge amount of the battery is the first reference charge amount, reset the accumulative value of current during charging and discharging of the battery, and reset the identified number of times.

Another aspect of the present disclosure provides a vehicle including: a solar generator; a first battery configured to supply power for driving at least one load and on which recharging is performed; a first charge amount detector configured to detect a charge amount of the first battery; and a controller configured to perform charging control on the first battery using electric energy generated by the solar generator in a parked state, determine whether the charge amount of the first battery detected by the first charge amount detector is greater than or equal to a first reference charge amount during the charging control of the first battery, and perform charging termination control on the first battery if the detected charge amount of the first battery is determined to be greater than or equal to the first reference charge amount.

The controller may identify an accumulative value of current during charging and discharging of the first battery, identify a number of times the charge amount of the first battery falls to a minimum charge or below, identify a number of the ignitions, and if the accumulative value of current exceeds a first reference value, the identified number of times the charge amount falls to a minimum charge or below exceeds a second reference value, or the identified number of the ignitions exceeds a third reference value, determine that a condition for entry into a refresh mode for charging the first battery to the first reference charge amount is satisfied.

The vehicle may further include a light amount detector configured to detect an amount of light incident on the solar generator, wherein the controller, in response to determining that the condition for entry into the refresh mode is satisfied, may identify the amount of light detected by the light amount detector, and if the identified amount of light is less than a first reference amount of light, may not perform the charging control on the battery, and if the identified amount of light is greater than or equal to a second reference amount of light, may perform the charging control on the first battery.

The controller may determine whether the charge amount of the first battery detected by the first charge amount detector is greater than or equal to a second reference charge amount if the identified amount of light is greater than or equal to the first reference amount of light and less than the second reference amount of light, and perform the charging control on the first battery if the charge amount of the first battery detected by the first charge amount detector is determined to be greater than or equal to the second reference charge amount.

The controller may predict an amount of power generated by the solar generator on the basis of the detected amount of light and a time remaining until a sunset if the detected charge amount of the first battery is determined to be less than the second reference charge amount, perform the charging control on the first battery if a value of the predicted amount of power minus an amount of power consumed by the at least one load is greater than or equal to zero, and may not perform the charging control on the first battery if the value of the predicted amount of power minus the amount of power consumed by the at least one load is less than zero.

The controller may cancel the refresh mode if the detected charge amount of the first battery reaches the first reference charge amount, resets the accumulative value of current during charging and discharging of the first battery, reset the identified number of times the charge amount falls to the minimum charge or below, and reset the identified number of the ignitions.

The vehicle may further include: a second battery; a second charge amount detector configured to detect a charge amount of the second battery; a switch allowing the solar generator to be connected one of the first battery and the second batter; and a light amount detector configured to detect an amount of light incident on the solar generator, wherein the controller, in response to determining that the condition for entry into the refresh mode is satisfied, identifies the amount of light detected by the light amount detector, and if the identified amount of light is less than a first reference amount of light, does not perform charging control on the first and second batteries, and if the identified amount of light is greater than or equal to a second reference amount of light, perform charging control on the first and second batteries.

The controller may identify the charge amount of the first battery detected by the first charge amount detector, identify the charge amount of the second battery detected by the second charge amount detector, and if the charge amount of the first battery is greater than or equal to a second reference charge amount during the charging control of the first and second batteries, perform preferential charging control on the first battery.

The controller may identify the charge amount of the first battery detected by the first charge amount detector, identify the charge amount of the second battery detected by the second charge amount detector, and if the charge amount of the second battery is less than a second reference charge amount during the charging control of the first and second batteries, perform preferential charging control on the first battery.

The controller may identify the charge amount of the first battery detected by the first charge amount detector, identify the charge amount of the second battery detected by the second charge amount detector, and if the charge amount of the first battery is less than a second reference charge and the charge amount of the second battery is greater than or equal to the second reference charge amount during the charging control of the first and second batteries, perform preferential charging control on the second battery.

The vehicle may further include an alternator, wherein the controller, in response to receiving an ignition-on command, may determine whether the charge amount detected by the first charge amount detector is less than the first reference charge amount, and if the detected charge amount is determined to be less than the first reference charge amount, control the alternator to charge the first battery.

Another aspect of the present disclosure provides a method of controlling a vehicle, the method including: determining, in response to the vehicle in a parked state, whether a condition for entry into a refresh mode of at least one battery provided in the vehicle is satisfied; predicting an amount of power generated by a solar generator if the condition for entry into the refresh mode is determined to be satisfied; determining whether the refresh mode is performable on the basis of the predicted amount of power; charging the at least one battery using the power generated by the solar generator if the refresh mode is determined to be performable; identifying a charge amount of the at least one battery; terminating the charging of the at least one battery if the identified charge amount is greater than or equal to a first reference charge amount; determining, in response to receiving an ignition-on command, whether the charge amount of the least one battery is greater than or equal to the first reference charge amount; operating an alternator if the charge amount of the least one battery is determined to be less than the first reference charge amount; and charging the at least one battery using power generated by the alternator until the charge amount of the at least one battery reaches the first reference charge amount.

The determining of whether the condition for entry into the refresh mode of the at least one battery may include: identifying an accumulative value of current during charging and discharging of the at least one battery; identifying a number of times the charge amount of the at least one battery falls to a minimum charge or below; identifying a number of the ignitions; and if the accumulative value exceeds a first reference value, the identified number of times the charge amount falls to a minimum charge or below exceeds a second reference value, and the identified number of the ignitions exceeds a third reference value, determining that the condition for entry into the refresh mode for charging the at last one battery to the first reference charge amount is satisfied.

The charging of the at least one battery in the parked state may include: detecting an amount of light incident on the solar generator; determining whether the identified charge amount of the at least one battery is greater than or equal to a second reference charge amount if the identified amount of light is greater than or equal to a first reference amount of light and less than a second reference amount of light, and performing charging control on the at last one battery if the detected charge amount of the at least one battery is determined to be greater than or equal to the second reference charge amount; and performing charging control on the at last one battery if the identified amount of light is greater than the second reference amount of light.

The method may further include if the identified amount of light is less than the first reference amount of light, not performing the charging control on the at least one battery.

The charging of the at least one battery in the parked state may include: determining whether the identified charge amount of the at least one battery is less than the second reference charge amount if the identified amount of light is greater than or equal to the first reference amount of light and less than the second reference amount of light; and determining whether a surplus amount of power exists in the amount of power generated by the solar generator on the basis of the amount of power generated by the solar generator and an amount of the power consumed by the vehicle if the charge amount of the at least one battery is determined to be less than the second reference charge amount, and performing the charging control on the at least one battery if the surplus amount of power is determined to exist.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a diagram illustrating a condition for entry into a refresh mode of first and second batteries provided in a vehicle in one form of the present disclosure.

FIGS. 8A and 8B are control flowcharts of a vehicle in one form of the present disclosure.

FIG. 9 is a diagram illustrating a condition for entry into a refresh mode of first and second batteries provided in a vehicle in one form of the present disclosure.

Figure 1:
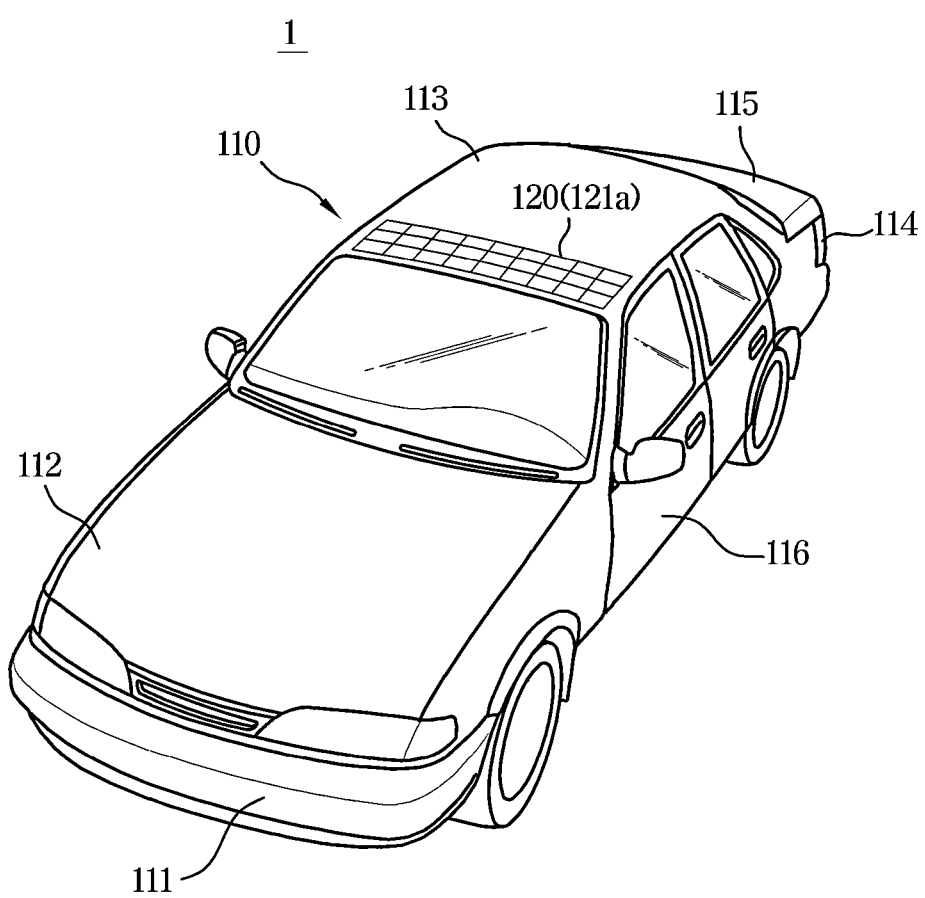
FIG. 1 is a diagram illustrating a vehicle body of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like numerals refer to like elements throughout the specification. Not all elements of forms of the present disclosure will be described, and description of what are commonly known in the art or what overlap each other in some forms of the present disclosure will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and some forms of the disclosure will be described with reference to the accompanying drawings.

FIG. 1 is a diagram illustrating a vehicle body of the vehicle 1 in some forms of the present disclosure.

The vehicle 1 includes a body having an interior and an exterior and a chassis, which is a part of the vehicle 1 except for the body, on which mechanical devices required for traveling are installed.

The exterior 110 of the body may be further provided with a solar panel 121*a* for collecting solar light.

The solar panel 121*a* includes a plurality of solar cells and may be provided on the roof panel 113. The solar panel 121*a* may be provided on the bonnet 112, the tail gate 115, and the front, rear, left, and right doors 116.

The chassis of the vehicle 1 further includes a power generation device, a power transmission device, a traveling device, a steering device, a braking device, a suspension device, a transmission device, a fuel device, front and rear wheels, and the like.

In addition, the vehicle 1 may further include a sensing device, such as a proximity sensor for detecting an obstacle or another vehicle in the rear or sides of the vehicle 1, a rain sensor for detecting rainfall and the amount of rainfall, and the like.

Such a vehicle 1 includes an electronic control unit (ECU) that controls the driving of the power generating device, the power transmission device, the traveling device, the steering device, the braking device, the suspension device, the transmission device, the fuel device, various safety devices, and various sensing devices.

In addition, the vehicle 1 may selectively include an electronic device (i.e., a load), such as a hands-free device, a global positioning system (GPS), an audio device, a Bluetooth device (that is, a communication device), a rear camera, a charging device, a black box, a heating wire of a seat, a high pass device, and the like.

The vehicle may further include an audio device, an air conditioner, and an audio video navigation (AVN) (132 in FIG. 2), which corresponds to a vehicle terminal for performing an audio function, a video function, and a navigation function.

The vehicle terminal may be provided to be mounted on or embedded in a dashboard.

The vehicle terminal may be provided as a touch screen in which a touch panel and a display panel are integrally formed with each other. In addition, the vehicle terminal may include only a display panel. In this case, the vehicle terminal may receive an operation command and operation information through an input provided in a center fascia or a head unit.

The vehicle 1 further includes a power supply device 120a that is electrically connected to an air conditioner, an audio device, an indoor lighting, a starter motor, and other electronic devices to supply power for driving. Details thereof will be described with reference to FIG. 2.

Figure 2:
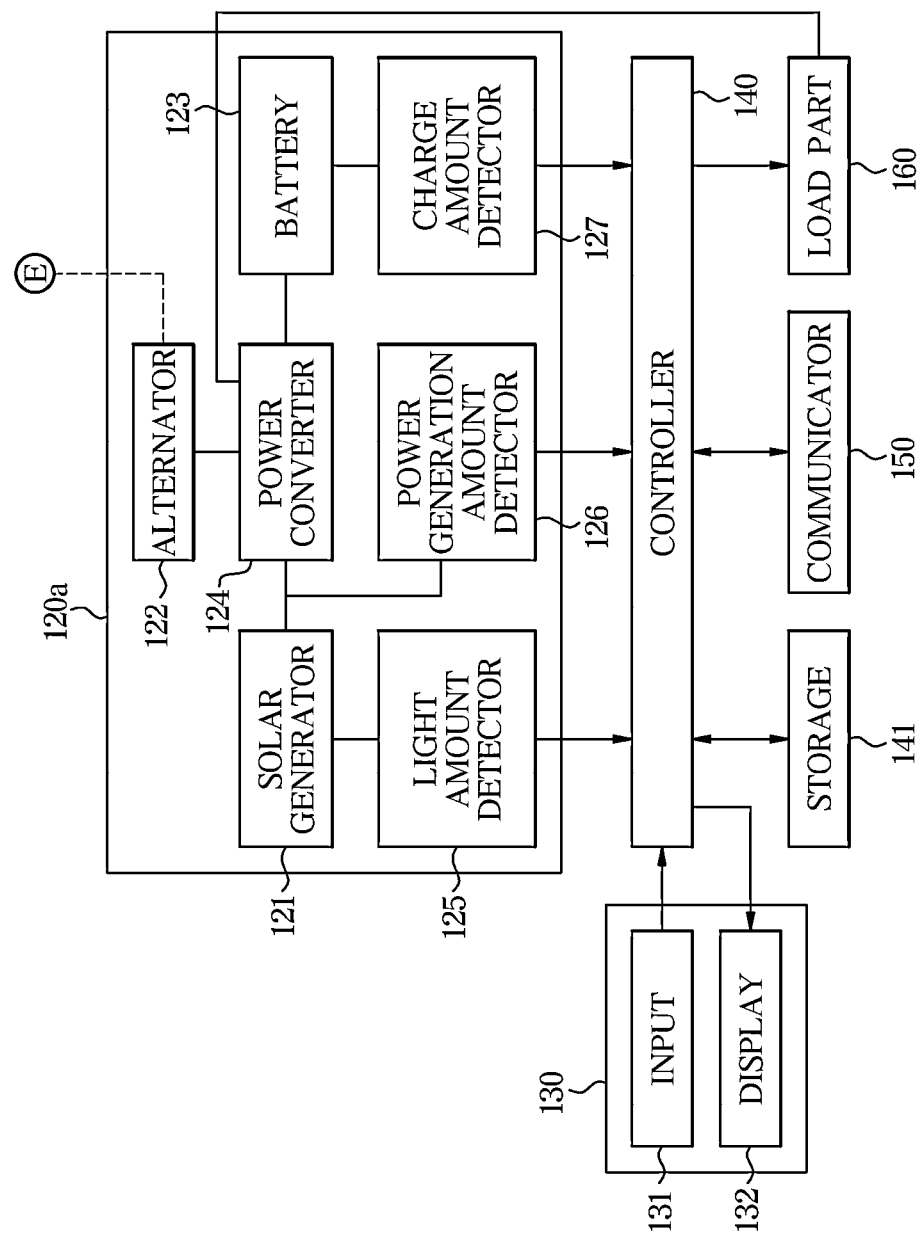
FIG. 2 is a control block diagram illustrating a vehicle in one form of the present disclosure.

FIG. 2 is a control block diagram illustrating a vehicle in some forms of the present disclosure.

The vehicle 1 includes a power supply device 120a, an input 131, a display 132, a controller 140, a storage 141, a communicator 150, and a load part 160.

The power supply device 120a is configured to supply power to a plurality of loads of the load part 160 provided in the vehicle 1 when the vehicle 1 is travelling or is stopped, and the power supply device 120a includes a solar generator 121 for converting solar energy into electrical energy, an alternator 122 connected to an engine E and generating electrical energy by the driving force of the engine E, and a battery 123 charged with power output from at least one of the solar generator 121 and the alternator 122.

The solar generator 121 includes a plurality of solar cells that convert solar energy into electrical energy (that is, electric power), performs solar power generation using the plurality of solar cells, and converts electrical energy generated by the solar power generation into the battery 123 such that the battery 123 is charged with the electrical energy.

The solar generator 121 may also supply power to at least one load when the vehicle 1 is parked or stopped. Accordingly, the load in the vehicle may be supplied with power even when the vehicle 1 is turned off.

In addition, the solar generator 121 may supply power generated by the solar generator 121 to the electronic device (that is, a load) when the electronic device uses power higher than a reference value during travel such that the fuel efficiency is prevented from being reduced.

The alternator 122 is connected to the engine E and converts the mechanical energy of the engine E into electrical energy, supplies power corresponding to the converted electrical energy to the battery 123, and supplies power to the plurality of loads of the load part 160 during travel.

That is, the alternator 122 generates electricity from the point in time when the engine E starts to operate, and supplies power to the loads, such as various electronic devices, and the battery 123 during travel.

The battery 123 supplies power to at least one load before the vehicle 1 is started, supplies power for starting the vehicle 1 to a starter motor at a time of starting, and performs charging with electric energy output from the alternator 122 or the solar generator 121 after the vehicle 1 is started.

The battery 123 performs charging by receiving electric energy generated from the alternator 122 connected to the engine E or electric energy generated from the solar generator 121 while the vehicle 1 is travelling, and performs charging by receiving electric energy generated from the solar generator 121 when the vehicle 1 is stopped.

The power supply device 120a further includes a power converter 124, a light amount detector 125, a power generation amount detector 126, and a charge amount detector 127.

The power converter 124 converts the voltage and current of power output from the alternator 122, the solar generator 121, and the battery 123 according to electrical characteristic requirements of each load to be supplied with the power.

That is, the power converter 124 may convert the magnitude of the voltage and current of the power output from the solar generator 121 and the alternator 122, and also convert the magnitude of the voltage and current of the power output from the battery 123.

The power converter 124 adjusts the magnitude of input power on the basis of the magnitude of the rated voltage and the rated current of each load and the magnitude of the rated voltage and the rated current of the battery 123.

In addition, the power converter 124 converts a component of an input current on the basis of a component of a current used in each load. For example, the power converter 124 converts a direct current component of the power output from the solar generator 121 into an alternating current component, or converts an alternating current component of the power output from the alternator 122 into a direct current component, or converts a direct current component of the power output from the battery 123 into an alternating current component.

That is, the power converter 124 may include a current converter, a voltage converter, a DC-AC converter, or an AC-DC converter.

The light amount detector 125 detects the amount of light incident on the solar generator 121 during solar power generation of the solar generator 121, and transmits information of the detected amount of light to the controller 140.

The power generation amount detector 126 detects the amount of power generated by the solar generator 121 during solar power generation of the solar generator 121 and transmits the detected amount of power generation of the solar generator 121 to the controller 140. The power generation amount detector 126 includes a voltage detector for detecting a voltage of the solar generator 121 and a current detector for detecting a current of the solar generator 121. The power generation amount detector 126 may be a power detector for detecting the power output from the solar generator 121.

The charge amount detector 127 detects a charge amount, which is the amount of electric energy charged in the battery 123, and transmits information about the detected charge amount of the battery 123 to the controller 140.

The charge amount detector 127 includes a current detector for detecting a current of the battery 123 and a voltage detector for detecting a voltage of the battery 123, and further includes a temperature detector for detecting a temperature of the battery 123, and detects the charge amount indicating the state of charge of the battery 123 using the detected current, voltage, and temperature of the battery 123. In addition, the charge amount detector 127 may further include a power detector for detecting the power of the battery 123.

The input 131 receives a user input. The user input may include an operation command for at least one load or at least one function execution command.

The input 131 receives an operation command for at least one of a plurality of loads provided in the vehicle 1 and transmits the input operation command of the at least one load to the controller 140.

The input 131 may receive a solar power generation display command for solar power generation of the solar generator 121, and transmit the input solar power generation display command to the controller 140.

The input 131 may include a start button for receiving a start on/off command.

The start button receives an operation command of the starter motor. That is, when the start button is turned on, the vehicle 1 operates the starter motor and drives the engine (not shown), which is a power generation device, through the operation of the starter motor.

The input 131 may receive an operation command of a navigation mode and destination information, and may receive selection information regarding one of found paths.

The display 132 may also display information about a battery refresh operation.

The display 132 may display information about solar power generation of the solar generator 121 and display information about effects according to use of the solar generator 121, so that the user may recognize the benefits of the solar generator 121.

The display 132 may include a cluster. Here, the cluster may be implemented in a digital type. The digital cluster displays travelling information of the vehicle, such as a rotational speed (revolutions per minute: RPM) of a shaft of the vehicle, a vehicle speed, a fuel efficiency, and a total travel distance, and monitoring information of the solar generator, and the like as an image. The monitoring information of the solar generator includes monitoring information related to failure diagnosis of the solar cell.

The cluster may further display information about an air conditioning adjustment function, information about a navigation function, information about a music playback function, information about a radio function, and information about a telephone function, and further include information about a fuel gauge, information about automatic shift selection lever, and the like.

The input 131 may be implemented as a touch panel, and the display 132 may be implemented as a display panel. The input 131 and the display 132 of the vehicle 1 may be provided as a touch screen in which the touch panel and the display panel are integrally formed with each other. In addition, the touch screen may be used as a vehicle terminal.

The input 131 may be implemented in the form of a button, a key, a switch, and a lever provided in the center fascia or the head unit.

The input 131 may also receive a sunset time.

The controller 140 determines whether the vehicle 1 is in a travelling state or a stopped state, and controls the operation of the power supply device 120a in response to a result of the determination. Here, the state of the vehicle 1 may be determined on the basis of the starting of the vehicle 1, the wheel speed, the vehicle speed, and the position of the shift lever.

The controller 140, in the controlling of the power supply, may control an on/off operation of a switch (not shown) connected to the solar generator 121 and the battery 123.

The controller 140, in response to receiving a start command of the vehicle 1, allows the power charged in the battery 123 to be supplied to the starter motor, and controls the operation of the alternator 122 such that the power generated from the alternator 1122 is supplied to the plurality of loads of the load part 160.

The controller 140 performs charging control on the battery 123 when the charge amount of the battery 123 is less than a predetermined charge amount while travelling. That is, the controller 140 allows the power generated by the alternator 122 to be supplied to the battery 123. Here, the predetermined charge amount may be a discharge limit charge amount for limiting the discharge of the battery.

The controller 140, when the vehicle is in a stopped state and at least one load is in operation, controls the solar power generation of the solar generator 121 such that the power generated by the solar generator 131 is supplied to the at least one load in operation.

In addition, the controller 140, when the vehicle 1 is a stopped state, may compare the charge amount of the battery 123 with the predetermined charge amount, and controls the solar power generation of the solar generator 121 if the charge amount of the battery 123 is less than a reference charge amount of the battery 123.

The controller 140 monitors the state of the solar generator 121 on the basis of the detected amount of light and the detected amount of power generation, and controls display of information about the monitored state of the solar generator 121.

Here, the monitoring of the state of the solar generator 121 includes monitoring the amount of power generation and performing a failure diagnosis of the solar generator 121. The controller 140 may perform controller area network (CAN) communication, local interconnect network (LIN) communication, Ethernet communication, Flex Ray communication, Serial communication, and the like with each detector of the power supply device 120a.

The controller 140 may determine the degree of influence of solar generation exerted on the fuel efficiency improvement on the basis of the amount of power generation of the solar generator 121 identified for each period and the amount of load supplied to each load, and control information about the determined degree of influence of the solar generation to be displayed on the cluster.

The controller 140 may control the monitoring information of the solar generator 121 to be displayed through the display 132 in response to a power generation display command transmitted from the input 131. The controller 140 may allow the monitoring information of the solar generator 121 to be displayed on the cluster.

Here, the monitoring information of the solar generator 121 includes information about the normal/abnormal state of the solar generator, the amount of power generated by the solar generator, and fuel efficiency improvement according to use of the solar generator.

The controller 140 may receive information about the charge amount related to the state of charge of the battery 123 from the charge amount detector 127 and control the display 132 to display the information about the charge amount of the battery 123.

In addition, the controller 140 may obtain information about the state of charge of the battery 123 on the basis of the detected voltage, current, and temperature of the battery 123.

In addition, the vehicle may further include a battery manager that includes a voltage detector for detecting a voltage of the battery 123, a current detector for detecting a current of the battery 123, and a temperature detector for detecting a temperature of the battery 123, and monitors the state of charge of the battery 123 on the basis of the detected voltage, current, and temperature of the battery 123.

The controller 140 accumulates the current charged into or discharged from the battery 123 on the basis of the current detected by the charge amount detector, and adds the accumulated current values, to thereby calculate an accumulative value of charged and discharged current of the battery 123.

The controller 140 monitors the state of charge (SOC) of the battery 123 and counts the number of times the SOC of the battery 123 enters a minimum charge. Here, the minimum charge refers to a threshold value from which the charge amount (%) of the battery 123 falls to a preset normal value or below.

The controller 140 receives state information, such as the travelling speed detected by the speed detector (not shown), the rotational speed (RPM) of the engine detected by an RPM detector, and the like, determines whether to perform a refresh mode during travel on the basis of the received travelling speed and RPM of the engine, and cumulatively counts the number of ignitions corresponding to on/off operations of the start button and records the counted number of the ignitions.

The controller 140, in response to the vehicle 1 being in a parked state, determines whether the battery current accumulative value, the number of occurrences of the entry into the minimum charge and the number of the ignitions satisfy conditions for the battery refresh. Here, the battery refresh conditions for the battery current accumulative value (Ah), the number of occurrences of the entry into the minimum charge, and the number of the ignitions may be provided as values stored in advance as a result obtained through repeated experiments and tests.

The controller 140, in response to the vehicle 1 in a parked state, determines whether an entry into a refresh mode is performable by determining whether at least one of the battery current accumulative value (Ah), the number of occurrences of the entry into the minimum charge, and the number of the ignitions satisfies the battery refresh condition, and if an entry into the refresh mode is determined to be performable, controls execution of the refresh mode until the charge amount of the battery 123 reaches a first reference charge amount (that is, the full charge amount). The refresh mode is a mode for performing battery recovery charge.

The controller 140, if it is determined that entry into the refresh mode in a parked state is performable, may determine whether to enter the refresh mode on the basis of the charge amount of the battery and the amount of light.

For example, the controller 140, if the charge amount of the battery is greater than a second reference charge amount and the detected amount of light is less than a first reference amount of light, determines that the battery is difficult to achieve full charge and thus determines that refresh mode is not performable. Accordingly, the controller 140 does not perform the refresh mode.

The controller 140, if the charge amount of the battery is greater than or equal to the second reference charge amount and the detected amount of light is greater than or equal to the first reference amount of light, determines that the refresh mode for full charge of the battery is performable.

The controller 140, if the charge amount of the battery is less than the second reference charge amount and the detected amount of light is greater than or equal to the first reference amount of light and less than a second reference amount of light, identifies a sunset time, obtains a time remaining until a sunset on the basis of the current time and the sunset time, predicts the amount of power generation on the basis of the detected amount of light and the obtained remaining time, determines whether a surplus amount of power exists by subtracting the total power consumption from the predicted amount of power generation, and if it is determined that a surplus amount of power exists, determines that the refresh mode is performable.

The total power consumption is the sum of the amount of power consumed by the at least one load and the amount of power consumed to charge the battery. The amount of power consumed by the at least one load in a parked state and the amount of power consumed to charge the battery may be previously stored information. The amount of power consumed by the at least one load in a parked state may be the amount of power corresponding to dark current.

The controller 140 may identify weather information and predict the amount of power generation on the basis of the identified weather information, the detected amount of light, and the sunset time. Here, the sunset time may be information stored by each month and date, and may be information received from a server (not shown). The weather information may be information received from the server.

The controller 140, if it is determined that entry of the battery refresh mode is performable, may identify the amount of power generation detected by the power generation amount detector by identifying the amount of power generated per hour or the amount of power generated per minute, may identify the amount of power to be generated by the solar generator (i.e., the amount of electricity) on the basis of the identified amount of power generation and the sunset time, and may determine whether a surplus amount of power exists in the identified amount of power generation by subtracting the total power consumption from the identified amount of power generation.

The controller 140 determines that the battery is fully charged if the charge amount detected by the charge amount detector during the refresh mode is equal to or greater than the first reference charge amount, terminates the refresh mode, and resets information about the refresh condition.

The controller 140, in response to receiving an ignition-on command while the identified charge amount is less than the first reference charge amount, controls the display to output information about incompletion of the refresh mode.

The controller 140, in response to receiving an ignition-on command while the identified charge amount is less than the first reference charge amount, controls the alternator to perform charging control on the battery during travel, identifies the charge amount detected by the charge amount detector during charging of the battery, and if the identified charge amount is equal to or greater than the first reference charge amount, determines that the battery is fully charged, and terminates the refresh mode.

The controller 140 may control the display to display information related to the termination of the refresh mode if the charge amount of the battery is greater than or equal to the first reference charge amount during travel.

The controller 140, in response to receiving an ignition-on command, may search for a position for performing the refresh mode of the battery on the basis of navigation information, and control the display to display information about the found position.

The controller 140 may include an engine controller that controls the operation of the engine, a power generation controller that controls the amount of power generation of the solar generator, a battery controller that manages the state of charge of the battery, and a power controller that controls the power of the vehicle. In addition, the controller 140 may be a controller in which the engine controller, the power generation controller, the battery controller, and the power controller are integrated with each other.

The storage 141 stores information about first, second, and third reference charge amounts.

The storage 141 stores first, second, and third reference values for determining whether the conditions of entry into the refresh mode are satisfied. Here, the first reference value is a reference value for the accumulative current value, the second reference value is a reference value for the number of times the charge amount of the battery enters the minimum charge, and the third reference value is a reference value for the number of the ignitions.

The storage 141 may store information about the amount of power consumed in a parked state. The amount of power consumed in a parked state may include the amount of power consumed by the at least one load and the amount of power consumed to charge the battery, and may further include the amount of power for dark current.

The storage 141 may be a memory implemented as a chip separated from the processor, which has been described above in connection with the controller 140, or may be implemented as a single chip integrated with the processor.

The storage 141 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like., but the implementation of the storage 141 is not limited thereto.

The communicator 150 transmits and receives information between various electronic devices and the controller.

The communicator 150 may include one or more components that enable communication between an external device and various electronic devices provided in the vehicle 1, and may include, for example, at least one of a short-range communication module, a wired communication module, and a wireless communication module.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a Zigbee communication module.

The wired communication module may include various wired communication modules, such as a controller area network (CAN) communication module, a local area network (LAN) module, a wide area network (WAN) module, or a value added network communication (VAN) module, and various cable communication modules, such as a universal serial bus (USB) module, a high definition multimedia interface (HDMI) module a digital visual interface (DVI) module, a recommended standard-232 (RS-232) module, a power line communication module, or a plain old telephone service (POTS) module.

The communicator may perform LIN, Ethernet, Flex Ray, Serial communication, and the like.

The wireless communication module may include wireless communication modules supporting various wireless communication methods, such as a Wi-fi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, and the like.

The load part 160 includes a plurality of loads that perform at least one function using the power output from the alternator 122, the battery 123, and the solar generator 121.

In more detail, the at least one load of the load part 160 may be supplied with the power output from the alternator 122 when the vehicle 1 travels, may be supplied with the power output from the solar generator 121 when the vehicle 1 is stopped, and also may be supplied with the power output from the battery 123 when the vehicle is stopped.

Here, the plurality of loads include an electronic device that receives power and performs at least one function on the basis of an operation command transmitted from the controller 140.

For example, the plurality of loads may include headlights, taillights, emergency lights, and indoor lamps. The plurality of loads may further include at least one of a vehicle terminal, a black box, a hand-free device, a GPS, an audio device, a Bluetooth device (i.e., a communication device), a rear camera, a charging device, a heating wire of a seat, and a high pass device.

For example, a device, such as a black box or a rear surveillance camera, among various electronic devices receives power from a first battery to continuously photograph the surroundings even when the vehicle is turned off and parked.

The plurality of loads may include a load that requires high power, such as active front steering (AFS), motor driven power steering (MDPS), rear wheel steering (RWS), and active roll stabilization (ARS).

Figure 3:
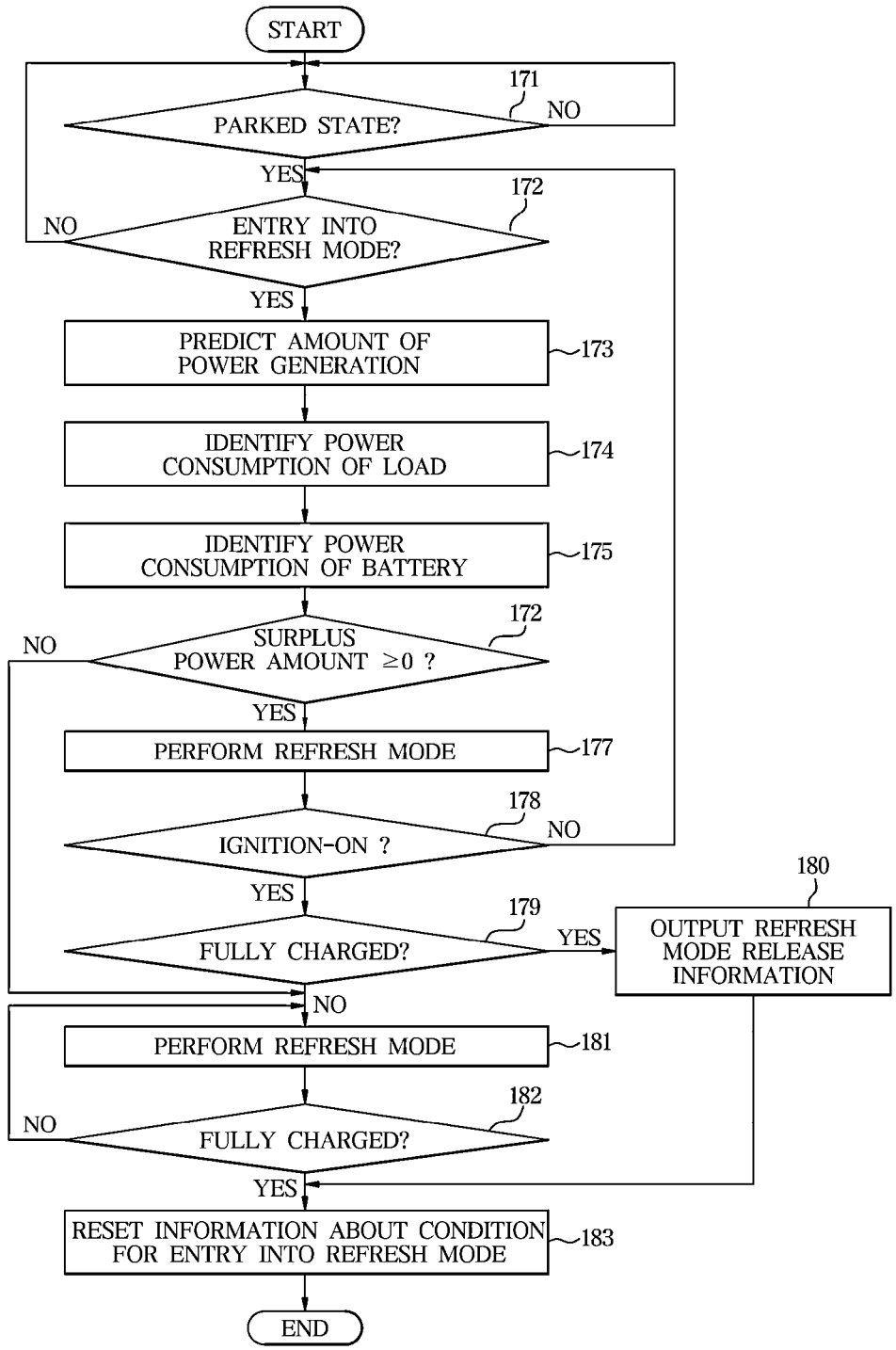
FIG. 3 is a control flowchart of a power supply device provided in a vehicle in one form of the present disclosure.

FIG. 3 is a control flowchart of a power supply device provided in a vehicle in some forms of the present disclosure.

The vehicle, in response to receiving an ignition-on command, allows power charged in the battery 123 to be supplied to the starter motor such that the starter motor operates.

The vehicle, after being started, operates the alternator 122 such that power generated by the alternator 122 is supplied to the plurality of loads to operate the plurality of loads, and if the charge amount of the battery 123 is less than a reference charge amount while travelling, supplies the power generated from the alternator 122 to the battery 123 to charge the battery 123.

The vehicle, during travel, accumulates the current charged into or discharged from the battery 123 on the basis of the current detected by the charge amount detector, and adds the accumulated current values, to thereby calculate an accumulative value of charged and discharged current of the battery 123.

The vehicle, during travel, monitors the state of charge (SOC) of the battery 123 and counts the number of times the charge amount corresponding to the SOC of the battery 123 enters the minimum charge minimum charge of. Here, the minimum charge refers to a threshold value from which the charge amount (%) of the battery 123 falls to a preset normal value or below.

The vehicle, during travel, counts the number of the ignitions corresponding to on/off operations of the start button and cumulatively stores the counted number of the ignitions.

In addition, the vehicle, even in a parked state, may cumulatively store the charged and discharged current of the battery, and may count the number of times that the charge amount of the battery reaches the minimum charge and cumulatively store the counted number of times that the charge amount of the battery reaches the minimum charge.

The vehicle, in a parked state (171), determines whether an operation of at least one load is required, and if it is determined that the operation of the at least one load is required, controls solar generation to be performed through the solar generator 121, and supplies the power generated by the solar generator 121 to the at least one load.

The vehicle collects the state information of the vehicle, the state information of the battery, and the state information of the solar generator, and determines whether the collected each piece of information satisfies a condition for entry into the refresh mode (172).

In more detail, the vehicle determines that the condition for entry into the refresh mode is satisfied if the accumulative value of the current charged into and discharged from the battery exceeds the first reference value. This is based on the fact that the battery endurance performance decreases as the accumulative value of the current charged into and discharged from the battery increases.

In addition, the vehicle determines that the condition for execution of the refresh mode is satisfied if the number of times the charge amount corresponding to SOC of the battery falls to the preset minimum charge or below exceeds the second reference value. This is based on the fact that a state of health (SOH) of the battery decreases as the number of occurrences of the entry into the minimum charge of the battery 123 increases.

In addition, the vehicle determines that the condition for execution of the refresh mode is satisfied if the number of the ignitions exceeds the third reference value. This is based on the fact that the durability performance is lowered in proportion to increasing current discharge of the battery 123.

On the other hand, if the accumulative value of the battery current, the number of occurrences of the entry into the minimum charge, and the number of the ignitions are below the respective reference values, the vehicle determines that the vehicle state and the battery state are normal, and continuously determines whether the refresh condition is satisfied.

The vehicle, if it is determined that the vehicle satisfies the condition for entry into the refresh mode, determines whether to perform the refresh mode on the basis of the detected amount of light.

Referring to FIG. 4, the vehicle, if the charge amount of the battery is greater than a second reference charge amount and the detected amount of light is less than a first reference amount of light, determines that the battery is difficult to achieve full charge, and does not perform the refresh mode.

The vehicle, if the charge amount of the battery is greater than or equal to the second reference charge amount and the detected amount of light is greater than or equal to the first reference amount of light, determines that the refresh mode for full charge of the battery is performable.

The second reference charge amount may be a charge amount corresponding to 85% of a SOC of the battery. The first reference amount of light may be 300 (W/m$^2$), and the second reference amount of light may be 600 (W/m$^2$).

The vehicle, if the charge amount of the battery is less than the second reference charge amount and the detected amount of light is greater than or equal to the first reference amount of light and less than a second reference amount of light, identifies a time remaining until a sunset, and predicts the amount of power generation on the basis of the detected amount of light and the obtained remaining time (173). Here, the sunset time may be information stored by each month and date, and may be information received from a server (not shown).

The vehicle identifies the amount of power consumed by the at least one load (174) and identifies the amount of power consumed to charge the battery (175), and obtains the total power consumption by summing the identified amount of power consumed by the at least one load and the amount of power consumed to charge the battery.

The vehicle obtains a surplus amount of power by subtracting the total power consumption from the predicted amount of power generation, determines whether the surplus amount of power is greater than or equal to zero (176), and if it is determined that the surplus amount of power is greater than or equal to zero, performs the refresh mode (177).

The vehicle, if it is determined that the entry into the refresh mode is performable in a parked state, may identify weather information, and predict the amount of power generation on the basis of the identified weather information, the detected amount of light, and the sunset time. Here, the weather information may be information received from the server (not shown).

In addition, the vehicle, if it is determined that the entry into the refresh mode is performable, may identify the amount of power generation detected by the power generation amount detector by identifying the amount of power generated per hour or the amount of power generated per minute, and may predict the amount of power generation to be generated by the solar generator (i.e., the amount of electricity) on the basis of the identified amount of power generation and the sunset time.

Here, the refresh mode is a mode in which charging is performed until the charge amount of the battery reaches a first reference charge amount (that is, a full charge amount). In this case, the vehicle intensively supplies the power generated by the solar generator 121 to the battery 123 to perform battery recovery charging.

The vehicle, in response to receiving an ignition-on command (178), determines whether the battery is in a full-charge state (179). The determining of the full-charge state includes determining whether the charge amount of the battery is greater than or equal to the first reference charge amount. The first reference charge amount may be a charge amount corresponding to 95% of the SOC of the battery.

The vehicle, if it is determined that the battery is in a full-charge state, terminates the refresh mode and controls the display to output refresh release information (180) and resets the information about the condition for entry into the refresh mode (183). That is, the vehicle initializes the accumulative value of the battery current, the number of occurrences of the entry into the minimum charge, and the number of the ignitions, which are cumulatively stored in the vehicle.

Figure 5A:
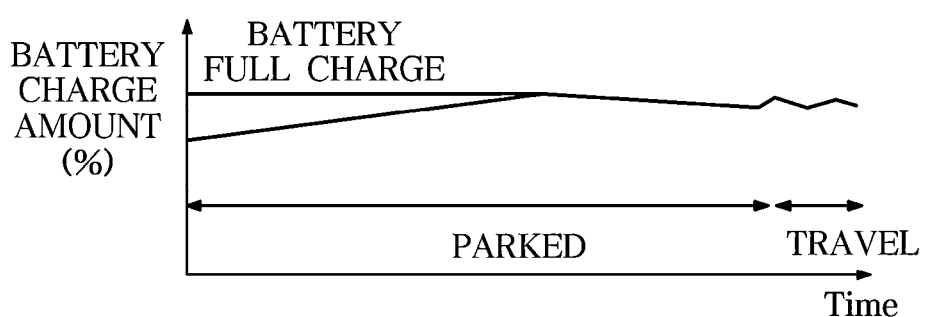
FIGS. 5A and 5B are diagrams illustrating execution of a refresh mode by states of a vehicle in one form of the present disclosure.

Referring to FIG. 5A, the vehicle may fully charge the battery by performing the refresh mode in the parked state, and supply the power charged in the battery to the at least one load while travelling.

The vehicle, if it is determined that the battery is not in a full-charge state, controls the display to output information about incompletion of the refresh mode, and continuously performs the refresh mode (181).

That is, the vehicle, in response to receiving an ignition-on command while the identified charge amount is less than the first reference charge amount, controls the alternator to perform charging control on the battery during travel, such that the refresh mode is maintained.

The vehicle, in the performing of the refresh mode while travelling, stops or minimizes undesired power supply to at least one of the plurality of loads in the vehicle, and concentrates the power generated by the alternator 122 on the battery recovery charging. In this case, the power supplied from the battery 123 to an undesired load may be also limited.

In addition, the vehicle, in response to receiving an ignition-on command while the identified charge amount is less than the first reference charge amount, may control the solar generator to perform charging control on the battery during travel, such that the refresh mode is maintained.

The vehicle identifies the charge amount detected by the charge amount detector while travelling, determines whether the battery is in a full-charge state on the basis of the identified charge amount (182), and if it is determined that the battery is in a full-charge state, controls the display to output refresh release information, and resets the information about the condition for entry into the refresh mode (183).

Figure 5B:
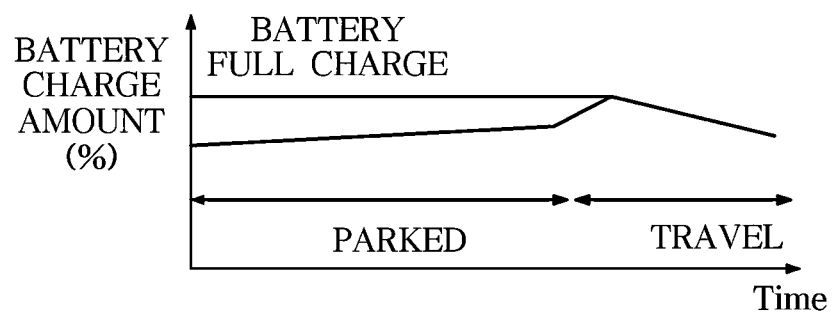

Referring to FIG. 5B, the vehicle performs the refresh mode in a parked state, and in response to receiving an ignition-on command, stops the refresh mode using the power of the solar generator and performs the refresh mode using the alternator during travel such that full charge of the battery is achieved, and terminates the refresh mode if the battery is fully charged, and supplies the power charged in the battery to at least one load while travelling.

The vehicle, in response to receiving an ignition-on command, may search for a position for performing the refresh mode of the battery on the basis of navigation information, and control the display to display information about the found position. In other words, in order to charge the battery using the solar generator instead of the alternator, the vehicle may inform the user of the position in which solar power generation is performable.

By performing initialization and full-charge of the battery, the charge/discharge balance is maintained and the endurance life is improved.

In addition, when the present disclosure is applied to a hybrid vehicle (HEV) and an electric vehicle (EV) using a high voltage battery as a driving energy source, capacity reduction of the battery is prevented and durability is secured, so that fuel efficiency is enhanced and the marketability of the vehicle is improved.

Figure 6:
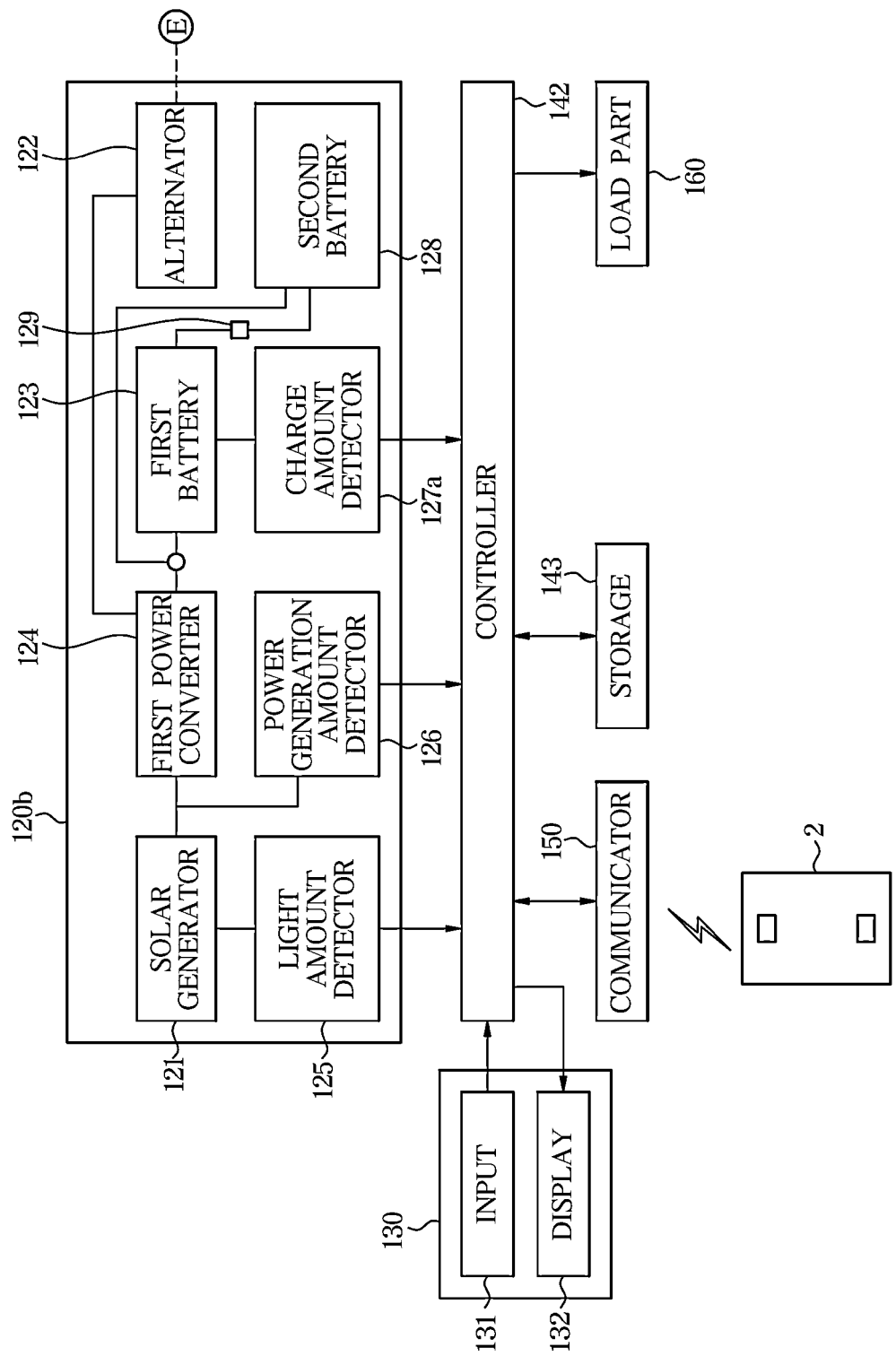
FIG. 6 is a control block diagram illustrating a vehicle in one form of the present disclosure.
Figure 7:
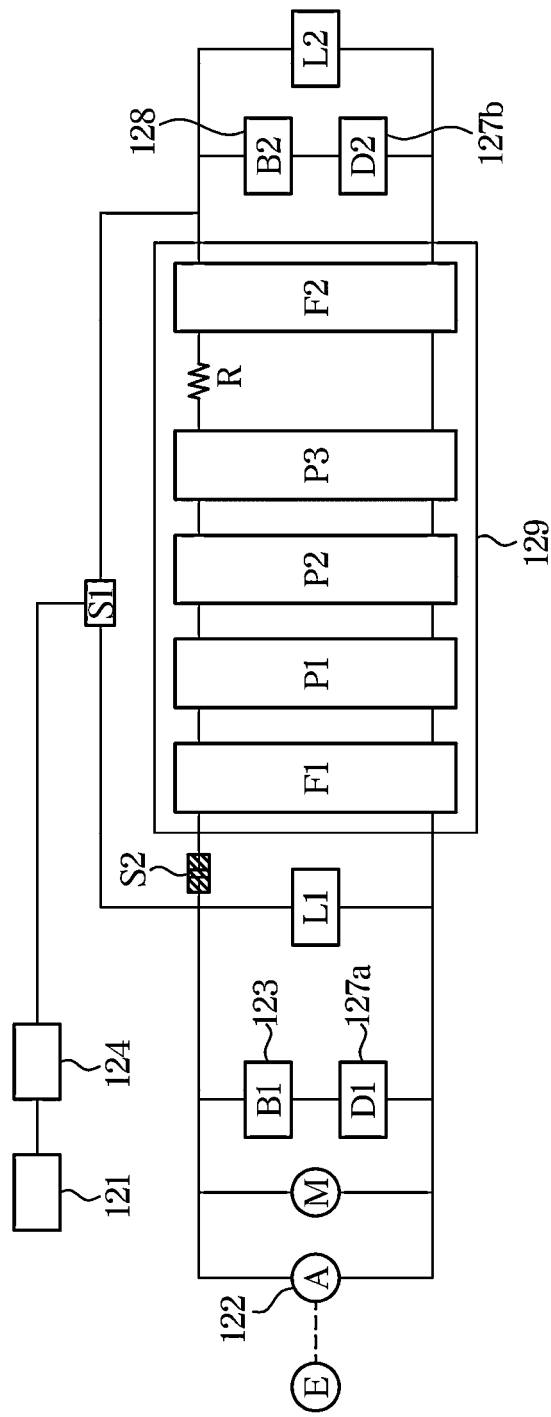
FIG. 7 is a block diagram illustrating a power supply device provided in a vehicle in one form of the present disclosure.

FIG. 6 is a control block diagram illustrating a vehicle in some forms of the present disclosure, and FIG. 7 is a block diagram illustrating a power supply device provided in a vehicle in some forms of the present disclosure.

The vehicle in some forms of the present disclosure includes a power supply device 120b, an input 131, a display 132, a controller 142, a storage 143, a communicator 150, and a load part 160. In the following description, details of parts identical to those of the previous forms, such as the input 131, the display 132, the communicator 150, and the load part 160 of the vehicle, will be omitted.

Different from the power supply device 120a in some forms of the present disclosure, the power supply device 120b of the vehicle in some forms of the present disclosure may further include a second battery 128, a second power converter 129, a charge amount detector 127b, a first switch S1 and a second switch S2.

In the following description, details of parts of the power supply device 120b identical to those of the power supply device 120a in some forms of the present disclosure will be omitted.

The power supply device 120b is configured to supply power to a plurality of loads of the load part provided in the vehicle when the vehicle is travelling or is stopped, and the power supply device 120b includes a solar generator 121 for converting solar energy into electrical energy, an alternator 122 connected to the engine E and generating electrical energy by the driving force of the engine E, a first battery 123 charged with the power output from at least one of the solar generator 121 and the alternator 122, and a second battery 128 charged with the power output from at least one of the solar generator 121, the alternator 122, and the first battery 123.

The first and second batteries 123 and 128 are batteries that may be chargeable and dischargeable.

The first battery 123 may supply power to the starter motor M, and may be charged with power received from the alternator 122 or may be charged with power received from the solar generator 121.

The first battery 123 may be connected to the alternator 122, the solar generator 121, and the starter motor M, and may be connected to basic loads L1 of the vehicle, such as a vehicle terminal, an audio device, and an indoor lamp, provided in the vehicle, to supply power to each of the connected loads L1.

The first battery 123 may supply a current to various electronic devices regardless whether the vehicle is turned on or off such that basic operations of the electronic devices provided in the vehicle are performed.

For example, a device, such as a black box or a rear surveillance camera, among the electronic devices receives power from the first battery 123 to continuously photograph the surroundings even when the vehicle is turned off and parked.

The second battery 128 is charged with power received from at least one of the first battery 123 and the solar generator 121. The second battery 128 may be charged with power received from the alternator 122.

The second battery 128 is connected to loads L2 requiring high power, such as an active front steering (AFS) device, a motor driven power steering (MDPS) device, a rear wheel steering (RWS) device, and an active roll stabilization (ARS) device, and supplies power to each of the connected loads L2.

The power supply device 120b further includes a first power converter 124, a light amount detector 125, a power generation amount detector 126, and a first charge amount detector 127a. In the following description, details of the first power converter 124, the light amount detector 125, the power generation amount detector 126, and the first charge amount detector 127a identical to the power converter 124, the light amount detector 125, the power generation amount detector 126, and the charge amount detector 127 in previous forms of the present disclosure will be omitted.

The power supply device 120b further includes the second power converter 129, the charge amount detector 127b, the first switch S1, and the second switch S2.

The second power converter 129 converts the voltage and the current of the power output from the solar generator 121 and the first battery 123 in response to the electrical characteristic requirements of the second battery. That is, the second power converter 129 converts the voltage and the current of the power output from the solar generator 121 and the first battery 123.

The second power converter 129 includes first and second filters F1 and F2 for removing noise on a circuit between the first battery 123 and the second battery, a resistor R, and a plurality of convertors P1, P2, and P3 to improve the efficiency of voltage step-up and step-down.

The second charge amount detector 127b detects a charge amount, which is the amount of electric energy charged in the second battery 128, and transmits information about the detected charge amount of the second battery 128 to the controller 142.

The second charge amount detector 127b further includes a current detector for detecting a current of the second battery 128, a voltage detector for detecting a voltage of the second battery 128, and a temperature detector for detecting a temperature of the second battery 128, and detects the charge amount corresponding to a state of charge of the second battery 128 using the detected current, voltage, and temperature of the second battery 128. In addition, the second charge amount detector 127b may further include a power detector for detecting the power of the second battery 128.

The first switch S1 is connected to the first power converter 124 and is selectively connected to one of the first battery 123 and the second battery 128. The first switch S1 performs switching between the first battery 123 and the second battery 128.

The first switch S1 allows the solar generator 121 and the first battery 123 to be electrically and mechanically connected to each other, or allows the solar generator 121 and the second battery 128 to be electrically and mechanically connected to each other such that the power converted by the first power converter 124 is supplied to the first battery 123 or to the second battery 128.

The second switch S2 turns on or off a connection between the first battery 123 and the second battery 128. The second switch S2 in an on-operation allows the power of the first battery 123 to be supplied to the second battery 128, or in an off-operation, blocks the power of the first battery 123 from being supplied to the second battery 128.

The starter motor M is supplied with electric power from the first battery 123 and is driven using the supplied electric power, and transmits a rotational force generated by the driving to the engine E such that the engine E is started.

The controller 142 predicts the power consumption of a first load L1 connected to the first battery 123 and determines whether to charge the first battery 123 on the basis of the predicted power consumption of the first load L1, and predicts the power consumption of a second load L2 connected to the second battery 128 and determines whether to charge the second battery 128 on the basis of the predicted power consumption of the second load L2.

The controller 142, during the charging control of the first battery, controls the second power converter to be in a buck mode if the voltage of the first battery 123 is lower than that of the second battery 128, and controls the second power converter to be in a boost mode if the voltage of the first battery 123 is higher than that of the second battery.

The controller 142, during the charging control of the second battery 128, controls the first power converter to be in a buck mode if the voltage of the second battery 128 is lower than that of the first battery, and controls the first power converter to be in a boost mode if the voltage of the second battery 128 is higher than that of the first battery.

The controller 142, when controlling the second power converter 129 to be in a bypass mode, controls an on-operation of a first switching unit and a second switching unit provided in a converter provided in the second power converter.

The controller 142, when controlling the second converter 129 to be in a boost mode or a buck mode to charge one of the first battery 123 and the second battery, controls a pulse width modulation (PWM) of one of the first switching unit, the second switching unit, a third switching unit, and a fourth switching unit provided in the converter of the second power converter 129.

The controller 142 may control the second switch to be at an on state during the charging control of the second battery 128 using the power of the first battery, and may control the second switch to be at an off state when the charge of the second battery 128 is completed.

The controller 142 may recognize the state of charge SOC of the first battery 123 on the basis of the detected current value of the first battery, the detected current value and voltage value of the first battery, or the current value, voltage value, temperature value of the first battery.

The controller 142 may recognize the state of charge SOC of the second battery 128 on the basis of the detected current value of the second battery, the detected current value and voltage value of the second battery, or the current value, voltage value, temperature value of the second battery.

The controller 140, when the vehicle 1 is in a parked state, determines whether entry into a refresh mode is performable by determining whether at least one of the battery current accumulative value (Ah), the number of occurrences of the entry into the minimum charge, and the number of the ignitions satisfies the battery refresh condition, and if entry into the refresh mode is determined to be performable, controls execution of the refresh mode until the charge amounts of the first and second batteries 123 and 128 reach respective first reference charges amount (that is, the full charge amount).

Here, the first reference charge amounts of the first and second batteries 123 and 128 may be the same as or different from each other.

The controller 142, if it is determined that entry into the refresh mode in a parked state is performable, may determine whether to enter the refresh mode on the basis of the charge amounts of the first and second batteries 123 and 128 and the amount of light.

For example, the controller 142, if the detected amount of light is less than a first reference amount of light, determines that the first and second batteries 123 and 128 are difficult to achieve full charge and thus determines that a refresh mode is not performable. Accordingly, the controller 142 does not perform the refresh mode.

The controller 142, if the charge amounts of the first and second batteries 123 and 128 are greater than or equal to respective second reference charges and the detected amount of light is greater than or equal to the first reference amount of light, determines that the refresh mode for full charge of the battery is performable. Here, the second reference charge amounts of the first and second batteries 123 and 128 may be the same as or different from each other.

The controller 142, if at least one of the charge amount of the first battery 123 and the charge amount of the second battery 128 is less than the second reference charge amount and the detected amount of light is greater than or equal to the first reference amount of light and less than a second reference amount of light, identifies a sunset time, obtains a time remaining until a sunset on the basis of the current time and the sunset time, predicts the amount of power generation on the basis of the detected amount of light and the obtained remaining time, determines whether a surplus amount of power exists by subtracting the total power consumption from the predicted amount of power generation, and if it is determined that a surplus amount of power exists, determines that the refresh mode is performable.

The total power consumption is the sum of the amount of power consumed by the at least one load and the amount of power consumed to charge the first and second batteries 123 and 128. The amount of power consumed by the at least one load in a parked state and the amount of power consumed to charge the first and second batteries 123 and 128 may be previously stored information. The amount of power consumed by the at least one load in the parked state may be the amount of power corresponding to dark current.

The controller 142 may identify weather information and predict the amount of power generation on the basis of the identified weather information, the detected amount of light, and the sunset time. Here, the sunset time may be information stored by each month and date, and may be information received from a server (not shown). The weather information may be information received from the server.

The controller 142, if it is determined that entry of refresh mode of the first and second batteries 123 and 128 is performable, may identify the amount of power generation detected by the power generation amount detector by identifying the amount of power generated per hour or per minute, may identify the amount of power generation to be generated by the solar generator (i.e., the amount of power) on the basis of the identified amount of power generation and the sunset time, and may determine whether a surplus amount of power exists in the identified amount of power generation by subtracting the total power consumption from the identified amount of power.

The controller 142 determines that the first and second batteries 123 and 128 are fully charged if the charge amounts detected by the first and second charge amount detectors during the refresh mode are equal to or greater than the first reference charge amounts, and terminates the refresh mode and resets information about the refresh condition.

The controller 142, in response to receiving an ignition-on command while one of the detected charge amounts of the first and second batteries 123 and 128 is less than the first reference charge amount, controls the display to output information about incompletion of the refresh mode.

The controller 142, in response to receiving an ignition-on command while at least one of the detected charge amounts of the first and second batteries 123 and 128 is less than the first reference charge amount, controls the alternator to perform charging control on the at least one of the first and second batteries 123 and 128 during travel, identifies the charge amount detected by the charge amount detector connected to the battery being charged, and if the identified charge amount is equal to or greater than the first reference charge amount, determines that the battery is fully charged, and terminates the refresh mode.

The controller 142 may control the display to display information related to the termination of the refresh mode if the charge amount of the at least one of the first and second batteries 123 and 128 is greater than or equal to the first reference charge amount during travel.

The controller 142 determines a battery to be charged first between the first battery 123 and the second battery 128 before performing the refresh mode. In this case, the controller 142 controls the second battery 128 to be preferentially charged if the charge amount of the first battery 123 is less than the second reference charge amount and the charge amount of the second battery 128 is greater than or equal to the second reference charge amount, and when the charge amount of the second battery 128 reaches the first reference charge amount, performs charging control on the first battery.

The controller 142 controls the first battery 123 to be preferentially charged if the charge amount of the second battery 128 is less than the second reference charge amount, and when the charge amount of the first battery 123 reaches the first reference charge amount, performs charging control on the second battery.

The controller 142 controls the first battery 123 to be preferentially charged if the charge amount of the first battery 123 is greater than or equal to the second reference charge amount, and when the charge amount of the first battery 123 reaches the first reference charge amount, performs charging control on the second battery.

The controller 142, when performing the charging control on the first battery 123 123, controls the first switch such that the first power converter and the first battery 123 are electrically and mechanically connected to each other, and when performing the charging controlling on the second battery, controls the first switch such that the first power converter and the second battery 128 are electrically and mechanically connected.

The controller 142 monitors the state of the solar generator on the basis of the detected amount of light and the detected amount of power generation, and in response to receiving a request command for the monitoring information from the user terminal 2, transmits to the user terminal 2 to state information of the solar generator 121 obtained by the monitoring.

The controller 142, in response to receiving an ignition-on command while the refresh mode is being performed, controls the alternator to perform charging control on at least one of the first and second batteries 123 and 128 whose charge amount is less than the first charge amount, identifies the charge amount detected during the charging of the at least one of the first and second batteries 123 and 128, and if the identified charge amount is equal to or greater than the first reference charge amount, determines that the at least one of the first and second batteries 123 and 128 is fully charged, and terminates the refresh mode.

The controller 142 may control the communicator to transmit performance information of the refresh mode to the user terminal in a parked state.

The controller 142 may predict the termination time of the refresh mode and transmit information about the predicted termination time to the user terminal.

The controller 142, if the condition for entry into the refresh mode is satisfied, may determine whether solar power generation is performable on the basis of the amount of light detected by the light amount detector, and if it is determined the solar power generation is not performable, transmit information about changing a parking position to the user terminal 2.

The terminal 2 is a device provided to enable movement and communication, and performs remote communication with the vehicle.

The terminal 2 may display refresh information of the battery and monitoring information of the solar generator.

Such a terminal may include smart phones, tablet PCs, notebook PCs, wearable devices, and the like.

The storage 143 stores the first and second reference charge amounts of the first battery 123 and the first and second reference charge amounts of the second battery.

Figure 8A:
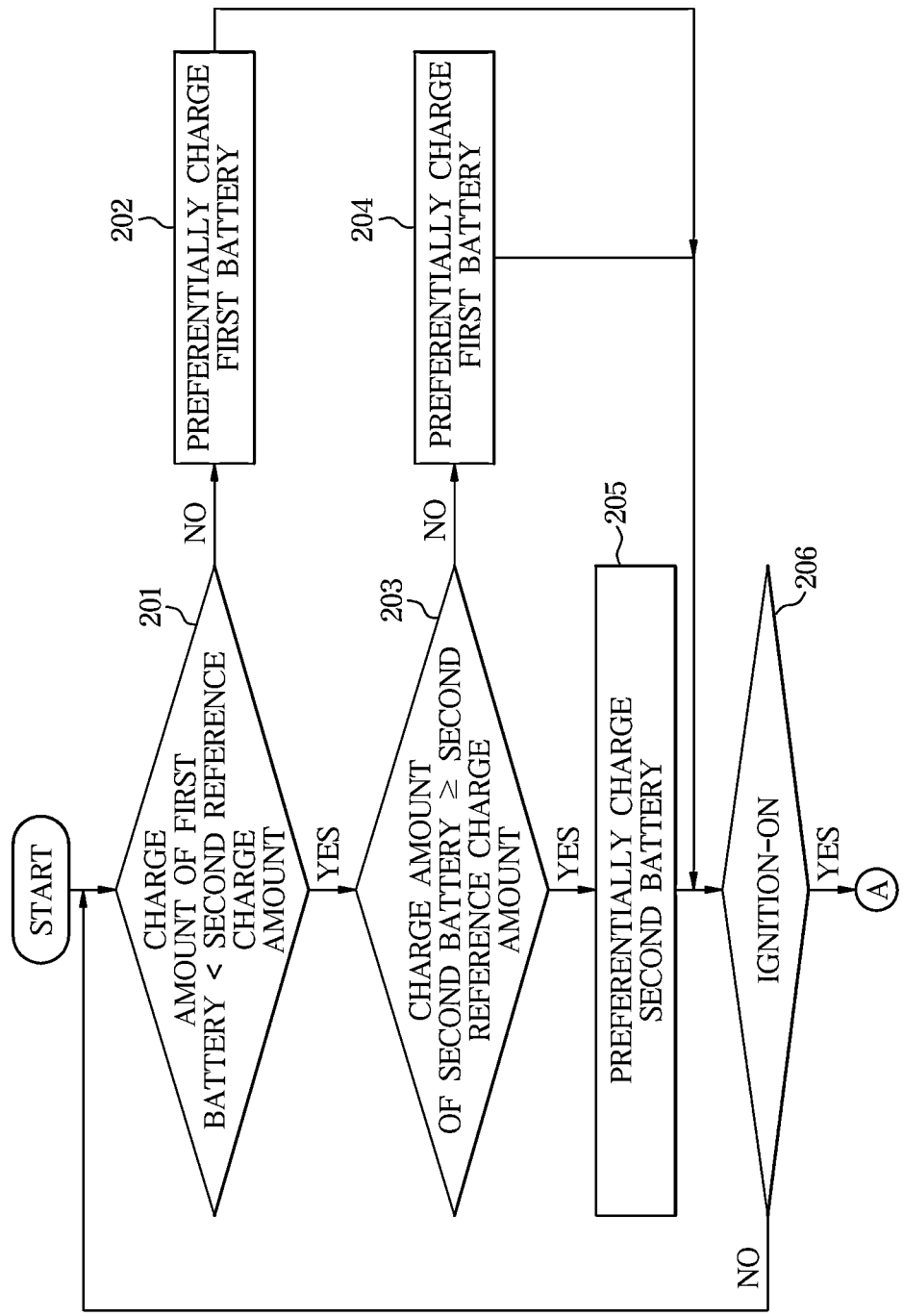

FIGS. 8A and 8B are control flowcharts of a vehicle in some forms of the present disclosure.

The vehicle, in a parked state, determines whether an operation of at least one load is required, and if it is determined that the operation of the at least one load is required, controls solar generation to be performed through the solar generator 121 and supplies the power generated by the solar generator 121 to the at least one load.

The vehicle collects state information of the vehicle, state information of the first and second batteries 123 and 128, and state information of the solar generator, and determines whether the collected each piece of information satisfies a condition for entry into the refresh mode. The determining whether the condition for entry into the refresh mode is satisfied is the same as in the previous forms of the present disclosure, and thus description thereof will be omitted.

The vehicle, if it is determined that the vehicle satisfies the condition for entry into the refresh mode, determines whether to perform the refresh mode on the basis of the detected amount of light.

The vehicle, if the detected amount of light is less than a first reference amount of light, determines that the battery is difficult to achieve full charge, and thus does not perform the refresh mode.

The vehicle, if the charge amounts of the first and second batteries 123 and 128 are greater than or equal to the second reference charge amounts and the detected amount of light is greater than or equal to the first reference amount of light, determines that the refresh mode for full charge of the battery is performable The second reference charge amount may be a charge amount corresponding to 85% of a SOC of the battery. The first reference amount of light may be 300 (W/m$^2$), and the second reference amount of light may be 600 (W/m$^2$).

The vehicle, if the charge amount of at least one of the first and second batteries 123 and 128 is less than the second reference charge amount and the detected amount of light is greater than or equal to the first reference amount of light and less than a second reference amount of light, identifies a time remaining until a sunset, and predicts the amount of power generation on the basis of the obtained remaining time and the detected amount of light The vehicle identifies the amount of power consumed by the at least one load, identifies the amount of power consumed to charge the battery, and obtains the total power consumption by summing the identified amount of power consumed by the at least one load and the amount of power consumed to charge the battery.

The vehicle obtains a surplus amount of power by subtracting the total power consumption from the predicted amount of power generation, determines whether the surplus amount of power is greater than or equal to zero (176), and if it is determined that the surplus amount of power is greater than or equal to zero, performs the refresh mode.

The vehicle, in the performing of the refresh mode, determines a battery to be charged first between the first battery 123 and the second battery, and performs charging control on the first and second batteries 123 and 128 on the basis of the determined priority order.

In more detail, the vehicle identifies the charge amount of the first battery 123 detected by the first charge amount detector and the charge amount of the second battery 128 detected by the second charge amount detector.

Then, the vehicle determines whether the charge amount of the first battery 123 detected by the first charge amount detector is less than the second reference charge amount (201), and if the charge amount of the first battery 123 is greater than or equal to the second reference charge amount, controls the first battery 123 to be preferentially charged (202).

The vehicle, if it is determined that the charge amount of the first battery 123 detected by the first charge amount detector is less than the second reference charge amount, determines whether the charge amount of the second battery 128 detected by the second charge amount detector is greater than or equal to the second reference charge amount (203).

The vehicle, if it is determined that the charge amount of the first battery 123 detected by the first charge amount detector is less than the second reference charge amount and the charge amount of the second battery 128 detected by the second charge amount detector is less than the second reference charge amount, controls the first battery 123 to be preferentially charged (204).

The vehicle, if it is determined that the charge amount of the first battery 123 detected by the first charge amount detector is less than the second reference charge amount and the charge amount of the second battery 128 detected by the second charge amount detector is greater than or equal to the second reference charge amount, controls the second battery 128 to be preferentially charged (205).

That is, the vehicle allows the first battery 123 to be preferentially charged if the charge amount of the first battery 123 detected by the first charge amount detector is greater than or equal to the second reference charge amount, and allows the second battery 128 to be preferentially charged if the charge amount of the second battery 128 detected by the second charge amount detector is greater than or equal to the second reference charge amount.

Here, the preferential controlling of the first battery 123 includes controlling the first switch S1 of the power supply device 120b such that the first power converter and the first battery 123 are electrically and mechanically connected to each other.

The vehicle, in the preferential controlling of the first battery, identifies the charge amount of the first battery 123 detected by the first charge amount detector, determines whether the identified charge amount of the first battery 123 is equal to or greater than the first reference charge amount, and if it is determined that the charge amount of the first battery 123 is equal to or greater than the first reference charge amount, terminates the refresh mode for the first battery, and performs the refresh mode on the second battery. In this case, the vehicle controls the first switch S1 of the power supply device 120b such that the first power converter and the second battery 128 are electrically and mechanically connected to each other to supply the power generated from the solar generator to the second battery 128 such that the second battery 128 is charged.

The preferential charging of the second battery 128 includes controlling the first switch S1 of the power supply device 120b such that the first power converter and the second battery 128 are electrically and mechanically connected to each other.

The vehicle, in the preferential controlling of the second battery, identifies the charge amount of the second battery 128 detected by the second charge amount detector, determines whether the identified charge amount of the second battery 128 is equal to or greater than the first reference charge amount, and if it is determined that the charge amount of the second battery 128 is equal to or greater than the first reference charge amount, terminates the refresh mode for the second battery, and performs the refresh mode on the first battery. In this case, the vehicle controls the first switch S1 of the power supply device 120*b* such that the first power converter and the first battery 123 are electrically and mechanically connected to each other to supply the power generated from the solar generator to the first battery 123 such that the first battery 123 is charged.

The vehicle, in response to receiving an ignition-on command during the refresh mode, determines whether the first battery 123 is fully charged (207), and if it is determined that the first battery 123 is not fully charged, determines whether the second battery 128 is fully charged (208).

The determining whether the first battery 123 is fully charged includes determining whether the charge amount of the first battery 123 is greater than or equal to the first reference charge amount.

The determining whether the second battery 128 is fully charged includes determining whether the charge amount of the second battery 128 is greater than or equal to the first reference charge amount.

The vehicle, if it is determined that the first and second batteries 123 and 128 are not fully charged, controls the alternator during travel to perform the refresh mode such that the first and second batteries 123 and 128 are charged (209).

The vehicle, if it is determined that only the first battery 123 is not fully charged, controls the alternator during travel to perform the refresh mode such that the first battery 123 is charged (210).

The vehicle, if it is determined that the first battery 123 is fully charged, determines whether the second battery 128 is fully charged (211), and if it is determined that the second battery 128 is fully charged, outputs release information of the refresh mode (212) and resets information about the condition for entry into the refresh mode (214). Accordingly, the user may recognize that the refresh mode of the battery is terminated.

The vehicle, if it is determined that only the second battery 128 is not fully charged state, controls the alternator during travel to perform the refresh mode such that the second battery 128 is charged (213).

That is, the vehicle, in response to receiving an ignition-on command, determines whether the first and second batteries 123 and 128 are fully charged, and if it is determined that the first and second batteries 123 and 128 are fully charged, terminates the refresh mode, and if it is determined that at least one of the first and second batteries 123 and 128 is not fully charged, performs the refresh mode on the at least one of the first and second batteries 123 and 128 during travel, and when the charge amount of the at least one of the first and second batteries reaches the first reference charge amount during travel, terminates the refresh mode.

Here, the determining of whether the first and second batteries 123 and 128 are fully charged includes determining whether the charge amounts of the first and second batteries 123 and 128 are greater than or equal to the first reference charge amounts. The first reference charge amount may be a charge amount corresponding to 95% of the SOC of the battery.

The vehicle, if it is determined that the first and second batteries are fully charged, terminates the refresh mode and controls the display to output refresh release information, and resets the information about the condition for entry into the refresh mode (214). That is, the vehicle initializes the accumulative value of the battery current, the number of occurrences of the entry into the minimum charge, and the number of ignitions that are cumulatively stored in the vehicle.

The vehicle may allow the battery to be fully charged by performing the refresh mode in a parked state and may supply the power charged in the battery to at least one load while travelling.

The vehicle, in response to receiving an ignition-on command when the identified charge amount of the battery is less than the first reference charge amount, may supply the power generated by the alternator during travel to the battery to perform charging control on the battery such that the refresh mode is maintained.

The vehicle, in the performing of the refresh mode during travel, stops or minimizes undesired power supply device to at least one of the plurality of loads in the vehicle, and concentrates the power generated by the alternator 122 on the battery recovery charging. In this case, the power supplied from the battery 123 to an undesired load may be also limited.

The vehicle, in response to receiving an ignition-on command, may search for a position for performing the refresh mode of the battery on the basis of navigation information, and control the display to display information about the found position. In other words, in order to charge the battery using the solar generator instead of the alternator, the vehicle may inform the user of the position in which solar power generation is performable. In this case, the vehicle may transmit the position information in which solar generation is performable to the user terminal.

In addition, the vehicle transmits information about the refresh mode when parked to the user terminal such that the user may recognize the information about the refresh mode of the battery when parked.

Meanwhile, the disclosed forms of the present disclosure may be embodied in the form of a recording medium storing instructions executable by a computer. The instructions may be stored in the form of program code and, when executed by a processor, may generate a program module to perform the operations of the disclosed forms of the present disclosure. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the energy generated from a solar generator in a parked state of the vehicle is used for a refresh control of a battery, so that the overall energy efficiency of the vehicle may be enhanced. The present disclosure performs full charge on the battery using surplus energy in the energy generated by the solar generator when parked, so that the fuel efficiency of the vehicle can be enhanced.

In addition, the present disclosure performs the battery refresh control by determining the availability of a solar generation on the basis of the amount of light, sunset time information or weather information, so that the battery refresh can be optimized. In addition, the present disclosure may optimally perform battery-to-battery refresh control even in a case when a dual battery is provided, so that the battery life can be extended.

The present disclosure visually displays the battery refresh, the solar generation, and the like in association with a cluster, a vehicle terminal (Audio Video Navigation: AVN), and a user terminal, so that the quality and marketability of the vehicle can be improved.

The present disclosure may display monitoring information about monitoring the state of solar power generation in real time, so that the user can easily recognize an abnormal state of the solar generator and the fuel efficiency improvement according to use of the solar generator.

The present disclosure may output information about an in completed refresh when travelling in a state in which the battery refresh is not completed, so that the user recognizes the incompletion refresh state, and thus allowing the user to perform parking outdoors.

The present disclosure can prevent the battery from being discharged due to using a load when parked.

The present disclosure can extend the life of the battery for starting the vehicle by preventing the aging of the battery, and ensure the quality assurance period of the battery for starting the vehicle.

As such, the present disclosure can increase the user's satisfaction, improve the user's convenience, reliability and vehicle safety, and ensure the competitiveness of the product.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of controlling a vehicle, the method comprising:
   in response to the vehicle in a parked state, determining, by a controller, whether a condition for entry into a refresh mode of at least one battery provided in the vehicle is satisfied;
   when the condition for entry into the refresh mode is determined to be satisfied, predicting, by the controller, an amount of power generated by a solar generator;
   determining, by the controller, whether to perform the refresh mode based on the predicted amount of power;
   when the refresh mode is determined to perform, charging, by the controller, the at least one battery using the power generated by the solar generator;
   identifying, by the controller, a charge amount of the at least one battery;
   when the identified charge amount is greater than or equal to a first reference charge amount, terminating, by the controller, charging the at least one battery;
   when an ignition-on command is received, determining, by the controller, whether the charge amount of the least one battery is greater than or equal to the first reference charge amount;
   when the charge amount of the least one battery is determined to be less than the first reference charge amount, operating, by the controller, an alternator; and
   charging, by the controller, the at least one battery using power generated by the alternator until the charge amount of the at least one battery reaches the first reference charge amount.

2. The method of claim 1, wherein determining whether the condition for entry into the refresh mode of the at least one battery further comprises:
   identifying, by the controller, an accumulative value of current during charging and discharging of the at least one battery;
   identifying, by the controller, a number of times the charge amount of the at least one battery falls to a minimum charge or below;
   identifying, by the controller, a number of the ignitions; and
   when the accumulative value exceeds a first reference value, the identified number of times the charge amount falls to a minimum charge or below exceeds a second reference value, and the identified number of the ignitions exceeds a third reference value, determining, by the controller, that the condition for entry into the refresh mode for charging the at last one battery to the first reference charge amount is satisfied.

3. The method of claim 1, wherein charging the at least one battery in the parked state further comprises:
   detecting an amount of light on the solar generator;
   when the identified amount of light is greater than or equal to a first reference amount of light and less than a second reference amount of light, determining whether the identified charge amount of the at least one battery is greater than or equal to a second reference charge amount;
   when the detected charge amount of the at least one battery is determined to be greater than or equal to the second reference charge amount, performing charging control on the at last one battery; and
   when the identified amount of light is greater than the second reference amount of light, performing charging control on the at last one battery.

4. The method of claim 3, wherein the method further comprises:
   when the identified amount of light is less than the first reference amount of light, not performing the charging control on the at least one battery.

5. The method of claim 3, wherein charging the at least one battery in the parked state further comprises:
   when the identified amount of light is greater than or equal to the first reference amount of light and less than the second reference amount of light, determining whether the identified charge amount of the at least one battery is less than the second reference charge amount;
   when the charge amount of the at least one battery is determined to be less than the second reference charge amount, determining whether a surplus amount of power exists in the amount of power generated by the solar generator based on the amount of power generated by the solar generator and an amount of the power consumed by the vehicle; and
   when the surplus amount of power is determined to exist, performing the charging control on the at least one battery.

* * * * *